United States Patent [19]

James et al.

[11] Patent Number: 4,459,652
[45] Date of Patent: Jul. 10, 1984

[54] PHASE-ON RIDE-THROUGH CONTROL CIRCUIT

[75] Inventors: Maurice James, Swindon; Michael J. Leach, Malmesbury; Stephen J. Mackay, Swindon, all of England

[73] Assignee: Emerson Electric Company, St. Louis, Mo.

[21] Appl. No.: 349,156

[22] Filed: Feb. 16, 1982

[51] Int. Cl.³ .............................................. H02M 7/00
[52] U.S. Cl. ....................................... 363/68; 363/101
[58] Field of Search ........................ 307/44, 45, 64, 82; 363/67, 68, 101

[56] References Cited

U.S. PATENT DOCUMENTS

| | | | |
|---|---|---|---|
| 2,834,931 | 5/1958 | Walker | 363/101 |
| 4,020,411 | 4/1977 | Tsuboi et al. | 363/68 |
| 4,315,208 | 2/1982 | McElroy et al. | 363/101 X |

FOREIGN PATENT DOCUMENTS 233675  5/1964  Austria ................................. 363/101

*Primary Examiner*—William M. Shoop
*Attorney, Agent, or Firm*—Lyon & Lyon

[57] ABSTRACT

A D.C. power supply (10, 44) having an auxiliary bridge rectifier (14, 38, 48) connected in series with a primary bridge rectifier (12, 46) is disclosed. The auxiliary bridge rectifier (14, 38, 48) "floats" above the potential of the primary bridge rectifier (12, 46) furnishing additional voltage at the D.C. power supply output (20, 22; 56, 58) whenever the A.C. mains voltage input to the main bridge rectifier (12, 46) drops below a predetermined value. In one embodiment of the present invention, a series of SCR's (26, 28) arranged in three-phase configuration perform the rectification and regulation functions of the primary bridge rectifier (12, 46) and the auxiliary bridge rectifier (14, 48). In an alternate embodiment of the present invention, paired SCR's (40) and diodes (42) are arranged in a half-controlled auxiliary bridge rectifier configuration (38). Individual firing angles for the various SCR's (26, 28, 40) are computed as a composite of several factors, including a firing delay factor $\alpha_o$, a load current correction factor $\Delta\alpha$ and a phase shift compensation factor $\delta\alpha$. Each of the several factors employed in calculating individual firing angles can be ascertained in accordance with the desired D.C. voltage output of the D.C. power supply (10, 44).

18 Claims, 13 Drawing Figures

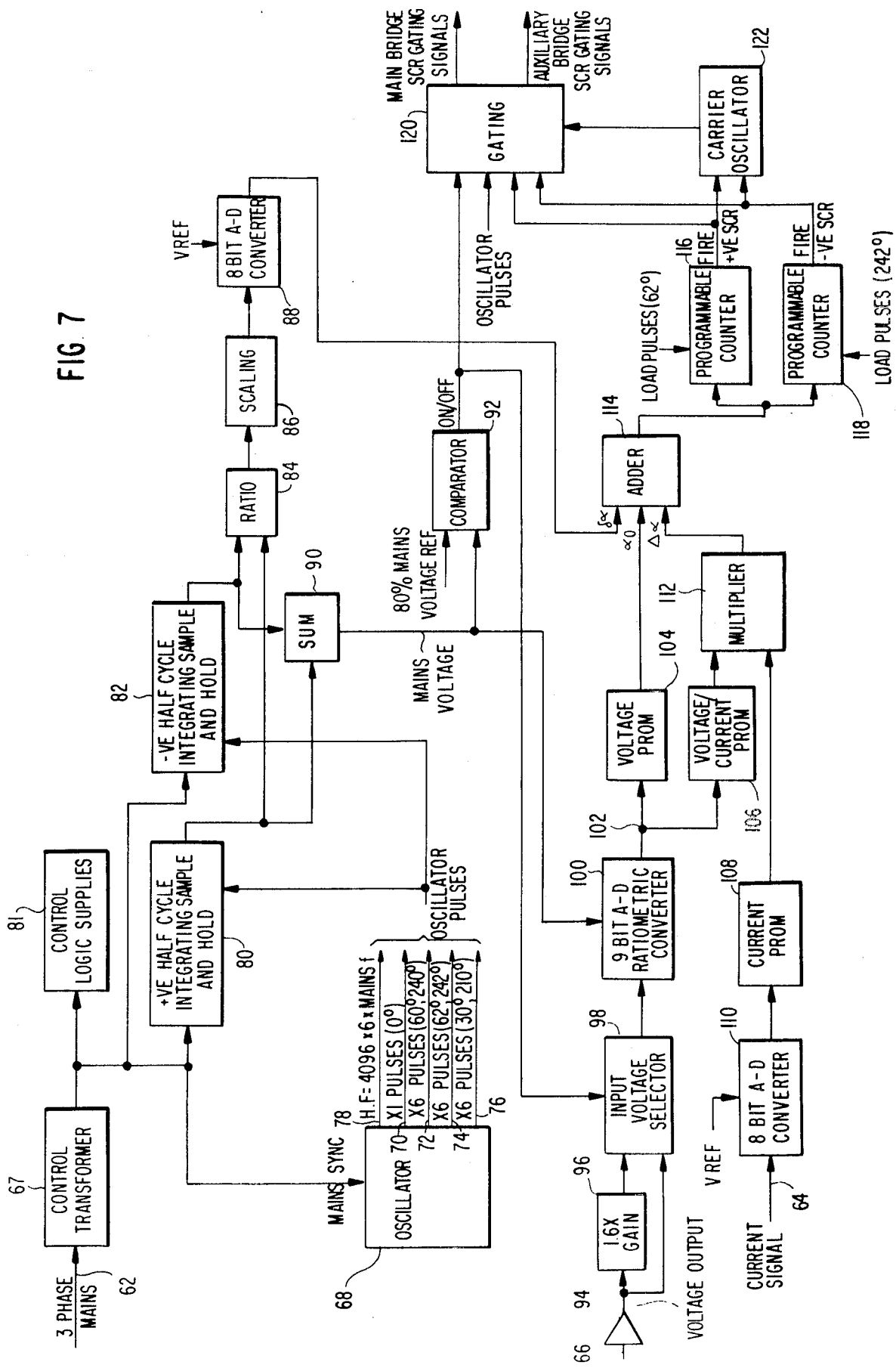

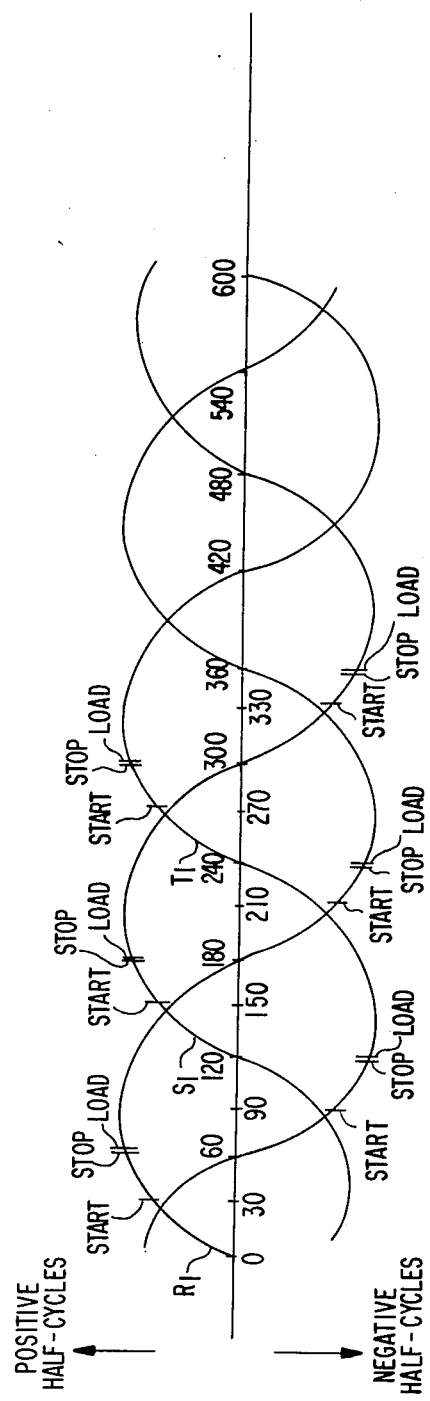

PHASE-ON RIDE-THROUGH CONTROL CIRCUIT

TECHNICAL FIELD

The present invention pertains to a means for regulating D.C. power supplies and is specifically directed to a bridge rectifier circuit wherein an auxiliary bridge rectifier connected in series with a main bridge rectifier operates to supply additional voltage at the bridge rectifier circuit output whenever the A.C. mains voltage input to the main bridge rectifier drops below a predetermined value.

BACKGROUND ART

Prior art attempts at maintaining constant D.C. voltage output from a D.C. power supply frequently make use of phase controlled or SCR bridge rectifiers which are triggered into conduction in accordance with the value of the A.C. mains voltage input to be rectified. Such phase controlled bridge rectifiers are generally capable of generating D.C. voltage outputs at two or three times the desired level, thus providing the reserve capacity necessary to compensate for A.C. mains variations. Under normal operating conditions, however, relatively large firing delays are required to achieve proper conduction in the phase control SCR's employed by the bridge rectifiers. Large SCR firing delays, of course, result in poor power factors as well as high RMS currents through the SCR's.

In an effort to overcome the disadvantages associated with large SCR firing delays, prior art bridge rectifier circuits have utilized a second, short-time rated phase controlled bridge rectifier which is connected in parallel to the primary bridge rectifier and activated in response to A.C. mains voltage drops. FIG. 1 illustrates a prior art circuit configuration of this type, having parallel-connected primary and auxiliary bridge rectifiers 2 and 4. A transformer 6 taps the incoming A.C. mains line 7 to provide power for the auxiliary bridge, and the auxiliary bridge SCR's 8 are only triggered into conduction for those intervals during which the A.C. mains voltage input dips below a threshold level. Supplemental voltage furnished by the auxiliary bridge rectifier in the FIG. 1 circuit configuration adequately compensates for A.C. mains voltage variation while simultaneously permitting the more efficient use of relatively low voltage SCR's 9 in the primary bridge rectifier. Despite the advantages inherent in performing voltage regulating functions with paired bridge rectifiers, however, the need for high voltage SCR's in the auxiliary bridge of the FIG. 1 circuit configuration is not eliminated. The parallel nature of the connection between the auxiliary and primary bridge rectifiers results in the application of full A.C. mains voltage across the primary of the transformer 6 interconnecting the two bridges. In conventional phase controlled, parallel-connected bridge rectifier circuits, the step-up ratio of transformer 6 is typically two-to-one. Hence, the secondary voltage of the transformer can rise to twice the value of the A.C. mains voltage under normal operating conditions, and again the use of high voltage SCR's, this time in the auxiliary bridge, is required. Because low current, high voltage SCR's are not generally available, it would be of obvious benefit to provide a bridge rectifier configuration capable of using low voltage rated silicon controlled rectifiers to provide a constant D.C. voltage output regardless of variations in the bridge rectifier A.C. mains voltage input.

DISCLOSURE OF THE INVENTION

It is therefore an object of the present invention to provide a supply of regulated D.C. power.

It is another object of the present invention to provide a D.C. power supply wherein the D.C. voltage output from the D.C. power supply remains constant during variations in the A.C. mains voltage input to the power supply.

It is yet another object of the present invention to provide a bridge rectifier circuit configuration wherein an auxiliary bridge rectifier is connected in series with a primary bridge rectifier, the auxiliary bridge rectifier operating to compensate for A.C. mains voltage variations by furnishing additional D.C. voltage to the primary bridge rectifier output whenever the A.C. mains voltage drops below a predetermined level.

It is a further object of the present invention to provide a regulated D.C. power supply comprising series-connected primary and auxiliary bridge rectifiers, each of the bridge rectifiers employing SCR's under the control of a firing pulse generator which furnishes the various SCR's with firing pulses at firing angles determined in part as a function of the desired level of D.C. voltage output from the power supply.

It is still a further object of the present invention to provide a regulated D.C. power supply having phase-controlled SCR's respectively arranged in series-connected auxiliary and primary bridge rectifier configurations, each of the SCR's being under the control of a firing pulse generator which, during normal operating conditions, directs firing pulses to the primary bridge SCR's at angles determined in accordance with the desired D.C. voltage output and which, during conditions of low A.C. mains voltage input, additionally fires the auxiliary bridge SCR's at angles calculated to produce the supplemental D.C. voltage necessary to offset the otherwise reduced D.C. voltage output from the primary bridge rectifier.

These and other objects of the present invention are achieved in a regulated D.C. power supply wherein a first or primary bridge rectifier employing phase-controlled SCR's receives A.C. mains voltage and, through appropriate manipulation of the SCR firing angles, furnishes a constant D.C. voltage output of pre-selected magnitude. In order to compensate for occasional, unexpected A.C. mains voltage variations or dips, a second or auxiliary bridge rectifier also employing phase-controlled SCR's is provided. Power to the auxiliary bridge rectifier is received from the A.C. mains line via a double wound transformer. The auxiliary bridge rectifier output is connected across a diode in series with the primary bridge rectifier output. A firing angle generator controls the conduction of both the primary and auxiliary bridge SCR's by generating a series of gating pulses at firing angles computed in accordance with the desired D.C. voltage output, the A.C. mains voltage input, and the load current being drawn through the rectifiers. In particular, the SCR firing angles necessary to achieve a desired D.C. voltage output level may be established by arithemetically combining a firing delay factor and a load current correction factor, the former factor being ascertained as a function of the ratio of the desired D.C. voltage output to the A.C. mains voltage input and the latter factor being ascertained as a function of the ratio of the actual load current to the full load current of the D.C. power supply. The firing angle may also be modified by a phase shift compensation factor which acts to offset any imbalance in the three A.C. mains phases relative to voltage. When the A.C. mains voltage input drops below 80% of nominal value, an ON/OFF signal in the firing pulse generator is used to initiate a ride-through period, during which period the auxiliary bridge SCR's are gated in the same manner as the primary bridge SCR's. The auxiliary bridge SCR's brought into conduction augment the operation of the primary bridge SCR's, providing a supplemental or additional voltage sufficient to bring the total D.C. voltage output of the two bridge rectifiers to the desired level. Inasmuch as the auxiliary and primary bridge rectifiers are series-connected, load current during the ride-through period flows from both bridge rectifiers, distributing the total D.C. voltage output across the two bridges. Thus, lower voltage rated SCR's are required for both bridges.

BRIEF DESCRIPTION OF THE DRAWINGS

The various features, objects and advantages of the present invention will become more apparent upon consideration of the following Brief Description of the Drawings together with the Best Mode for Carrying Out the Invention, wherein:

FIG. 7 is a detailed schematic of the firing pulse generator shown in FIG. 5; and FIG. 8 graphically depicts the timing of various control pulses used to synchronize the operation of the firing pulse generator of FIGS. 5 and 7 relative to the various phases of the A.C. mains voltage input.

BEST MODE FOR CARRYING OUT THE INVENTION

Figure 2:
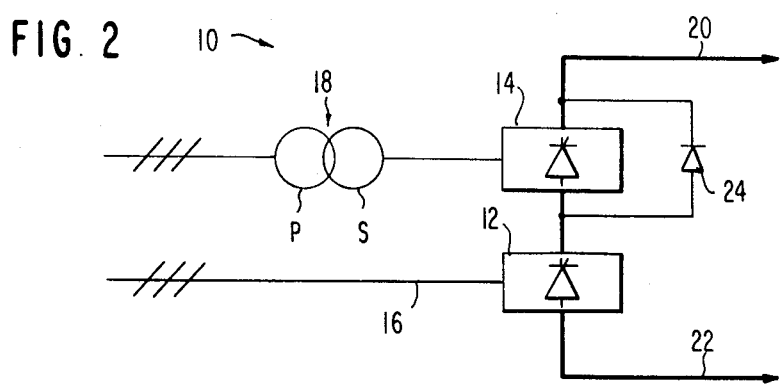
FIG. 2 is a simplified schematic of the regulated D.C. power supply of the present invention, showing the series connection between the phase-controlled auxiliary bridge rectifier and the phase-controlled primary bridge rectifier.

The basic improvement in the circuit configuration of the present invention over prior art regulated D.C. power supplies employing bridge rectifiers can best be seen in FIG. 2. More particularly, regulated D.C. power supply 10 includes a phase controlled primary bridge rectifier 12 connected to a phase controlled auxiliary bridge rectifier 14 in series fashion, rather than in the parallel fashion associated with prior art devices. Auxiliary bridge rectifier 14 provides a means for supplementing the D.C. voltage output of the primary bridge rectifier during periods of reduced A.C. mains voltage input, i.e., during ride-through periods. Three phase A.C. mains line 16 serves as the basic source of unregulated A.C. voltage for primary bridge rectifier 12. Operating power for auxiliary bridge rectifier 14 is received from the secondary s of transformer 18. D.C. voltage output resulting from the conduction of primary and auxiliary bridge rectifiers 12 and 14 is applied to D.C. bus leads 20 and 22. Free wheel diode 24 furnishes an alternate path for the load current drawn from the primary bridge rectifier when the auxiliary bridge rectifier is not conducting.

Figure 1:
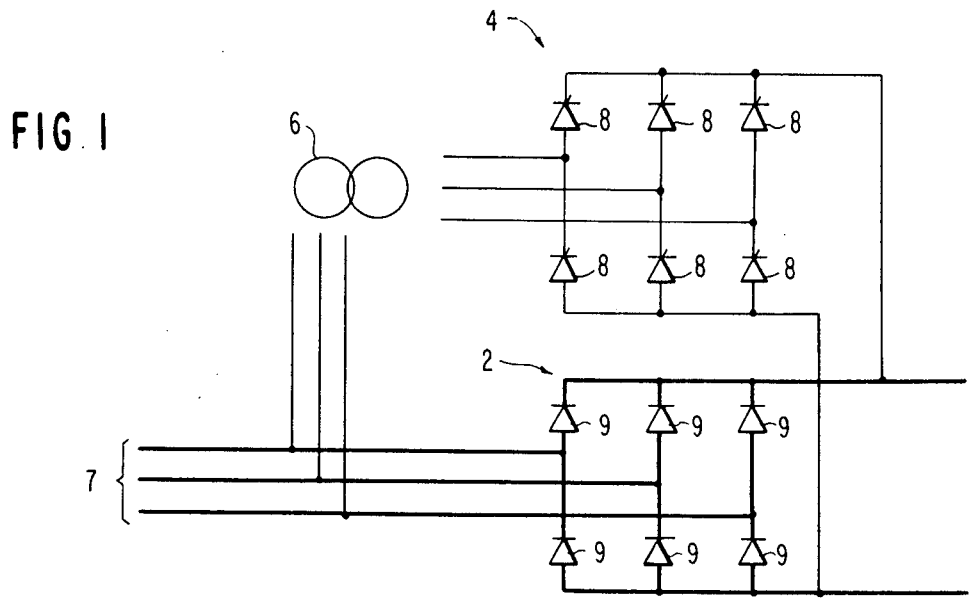
FIG. 1 discussed above is a circuit schematic of a prior art regulated D.C. power supply showing the parallel connection between the auxiliary bridge rectifier and the primary bridge rectifier.

Although in normal practice the primary p of transformer 18 taps three phase mains line 16, the two bridge rectifiers 12 and 14 can be thought of as independent seriesconnected bridge rectifiers for purposes of analyzing the voltage characteristics of D.C. power supply 10, and hence the connection between the transformer primary p and the three phase mains line 16 is not shown in FIG. 2. Upon reflection, it is evident that the D.C. voltage output level across the D.C. bus leads is comprised of two components. The first component is generated by primary bridge rectifier 12, while the second component is generated by auxiliary bridge rectifier 14 when the auxiliary bridge rectifier is conducting. This second voltage component essentially "floats" above the potential of the primary bridge rectifier, distributing the full D.C. voltage output from D.C. power source 10 across both bridge rectifiers and permitting the use of relatively low voltage rated components in each bridge rectifier. By way of contrast, the full D.C. voltage output appears equally across both the auxiliary bridge rectifier 4 and the primary bridge rectifier 2 in the parallel-connected circuit of FIG. 1, requiring the use of relatively high voltage rated bridge rectifier components as discussed above.

Figure 3:
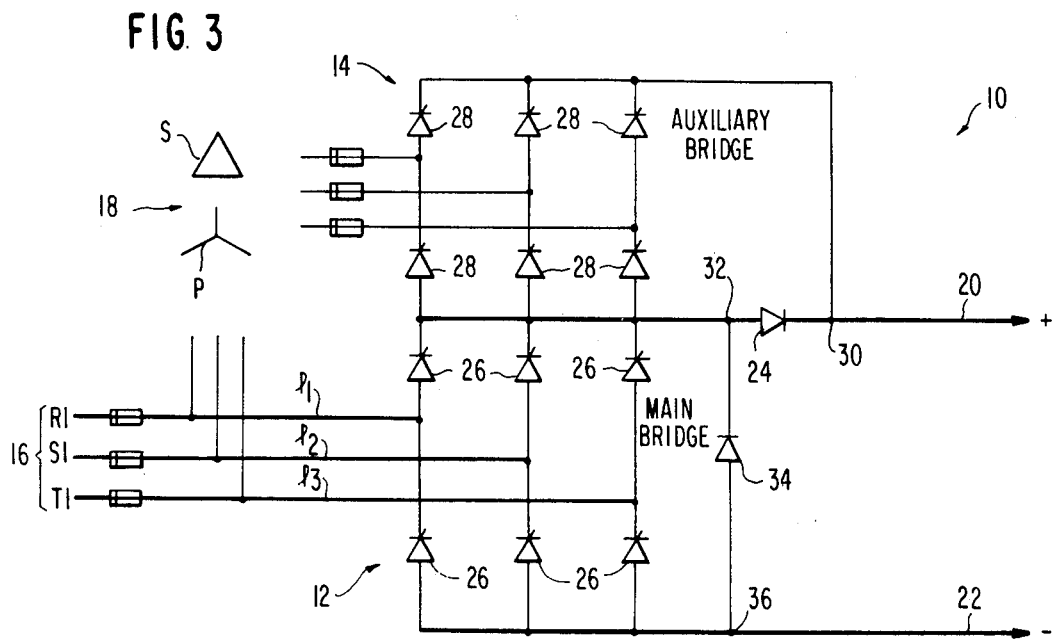
FIG. 3 is a more detailed diagram of the circuit illustrated in FIG. 2.

FIG. 3 provides a more detailed illustration of regulated D.C. voltage supply 10, wherein A.C. mains line 16 includes three leads $1_1$, $1_2$ and $1_3$ respectively carrying the individual phases $R_1$, $S_1$ and $T_1$ of the A.C. mains voltage input. A series of SCR's 26 arranged in three phase configuration perform the rectification and regulation function of primary bridge rectifier 12 and a series of SCR's 28 similarly arranged in three phase configuration provide the rectification and regulating function of auxiliary bridge rectifier 14. Each of the SCR's 26 and 28 is associated with an alternate half-cycle of one of the individual phases $R_1$, $S_1$ and $T_1$ on A.C. mains line 16. Transformer 18 must be capable of supporting the full A.C. mains voltage input while supplying maximum load current for the duration of the ride-through period. The transformer must also be double wound to provide isolation, and is normally constructed in STAR-STAR or DELTA-DELTA fashion although a STAR-DELTA format can also be employed to reduce ripple effects in the D.C. voltage output. The transformer ratio, of course, determines the maximum value of supplemental voltage that can be added to the output of the primary bridge rectifier as a result of the operation of the auxiliary bridge rectifier. As in FIG. 2, the free wheel diode 24 is connected across the output terminals 30, 32 of the auxiliary bridge rectifier to provide a path for load current flow between D.C. bus leads 20 and 22 when the auxiliary bridge rectifier is not conducting. A second diode 34 may, if desired, be connected across output terminals 32 and 36 of the primary bridge rectifier 12 as an additional free wheel device.

Figure 4:
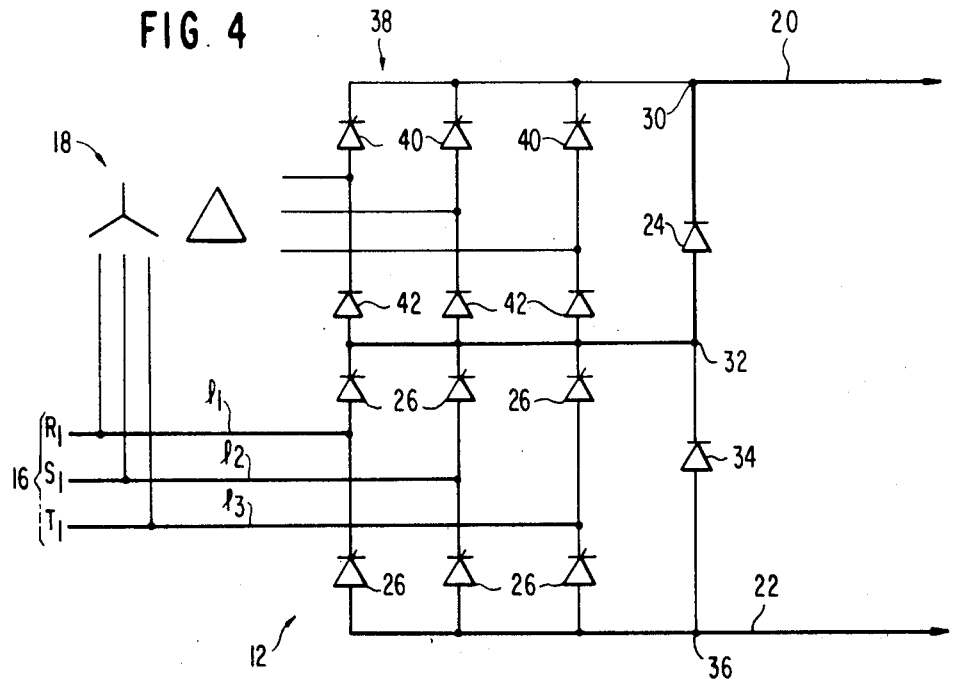
FIG. 4 illustrates an alternate embodiment of a regulated D.C. power supply constructed in accordance with the present invention.

FIG. 4 illustrates an alternate embodiment of the present invention, wherein auxiliary bridge rectifier 14 is replaced with a modified auxiliary bridge rectifier 38. Auxiliary bridge rectifier 38 is again connected in series with primary bridge rectifier 12. The balanced series of SCR's 28 in auxiliary rectifier bridge 14, however, is replaced by paired SCR's 40 and diodes 42. Auxiliary bridge rectifier 38 thus functions as a half-controlled bridge rectifier, but in all other respects the operation of auxiliary bridge rectifier 38 together with primary bridge rectifier 12 is identical to that of auxiliary bridge rectifier 14 and and primary bridge rectifier 12 in FIG. 3. That is, the series connection between the two bridge rectifiers essentially allows the auxiliary bridge rectifier to "float" above the potential of the primary bridge rectifier such that conduction of the auxiliary bridge rectifier during ride-through periods distributes the D.C. voltage output evenly across the two bridge rectifiers.

Figure 5:
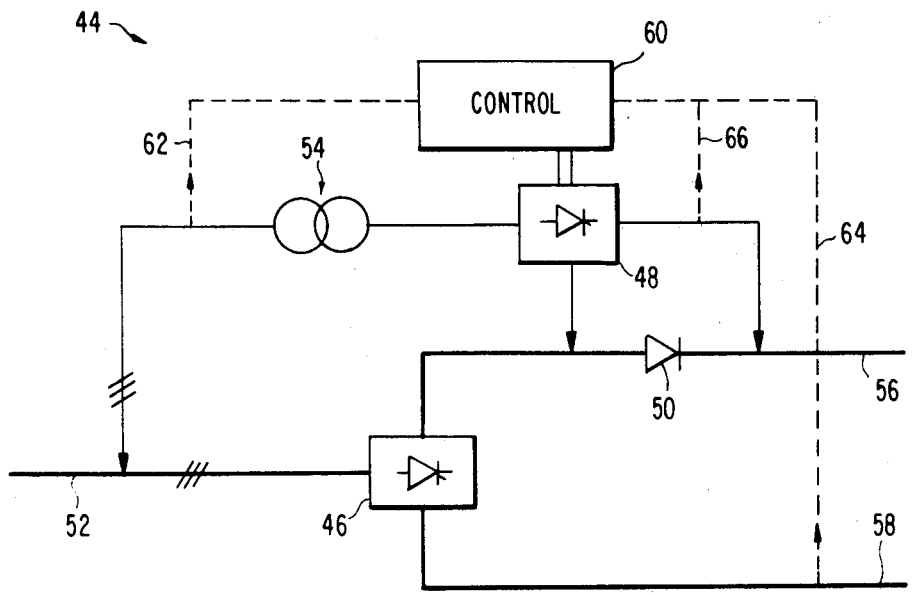
FIG. 5 is a simplified schematic of the firing pulse generator connected to control the SCR's employed in the auxiliary bridge rectifier and primary bridge rectifier of FIGS. 2, 3 and 4.

A simple control schematic for use in governing the operation of the D.C. power supply of the present invention is shown in FIG. 5. As with the FIGS. 2–4 embodiments, the FIG. 5 power supply 44 includes primary and auxiliary bridge rectifiers 46 and 48 connected in parallel across diode 50. Auxiliary bridge rectifier 48 is in turn connected to A.C. mains line 52 via double wound transformer 54. A regulated D.C. voltage output is applied to D.C. bus leads 56 and 58 in response to the conduction of individual SCR's (not shown in FIG. 5) in both the primary and auxiliary bridge rectifiers. The bridge rectifier SCR's are gated into conduction by firing pulses received from a control or firing pulse generator 60. Each of the firing pulses is generated at a firing angle determined in accordance with the desired D.C. voltage output, the available A.C. mains voltage input, and the amount of load current flowing through the power supply. Signals representing the available A.C. mains voltage input, the amount of load current and the desired D.C. voltage output are respectively furnished to firing pulse generator 60 via sensing leads 62, 64 and 66.

The purpose of the firing pulse generator 60, as indicated above, is to gate the SCR's of the primary and auxiliary bridge rectifiers into conduction at precisely defined firing angles such that the D.C. voltage output from the primary and auxiliary bridge rectifiers combined reaches or is regulated to the desired level. More particularly, two firing angles $\alpha$, one for the positive half cycle and one for the negative half cycle, are computed for each phase $R_1$, $S_1$, and $T_1$ of the A.C. mains voltage input. The values of $\alpha$ for various bridge rectifier operating parameters establish a family of curves such as those depicted in FIG. 6A, with each curve corresponding to a different load current. Calculations of the individual firing angles $\alpha$ associated with each half cycle of each phase $R_1$, $S_1$ and $T_1$ can be simplified by analyzing $\alpha$ as a composite of several factors, including a firing delay factor $\alpha_o$, a load current correction factor $\Delta\alpha$ and a phase shift compensation factor $\delta\alpha$, i.e., $$\alpha = \alpha_o + \Delta\alpha + \delta\alpha \tag{1}$$

The firing delay factor $\alpha_o$ represents the value of the firing angle $\alpha$ at 100% full-load current, and is ascertained as a function of the ratio between the desired D.C. voltage output and the A.C. mains voltage input. FIG. 6B graphically depicts the $\alpha_o$ or 100% full-load current curve from FIG. 6A in renormalized form.

The load current correction factor $\Delta\alpha$ represents the change in $\alpha$ caused by variations in load current, and may be found by multiplying a load current correction angle A by a fractional factor $\chi$ dependent upon the amount of load current being drawn as a percentage of full load current, i.e.:

$$\Delta\alpha = \chi \times A \tag{2}$$

Figure 6A:
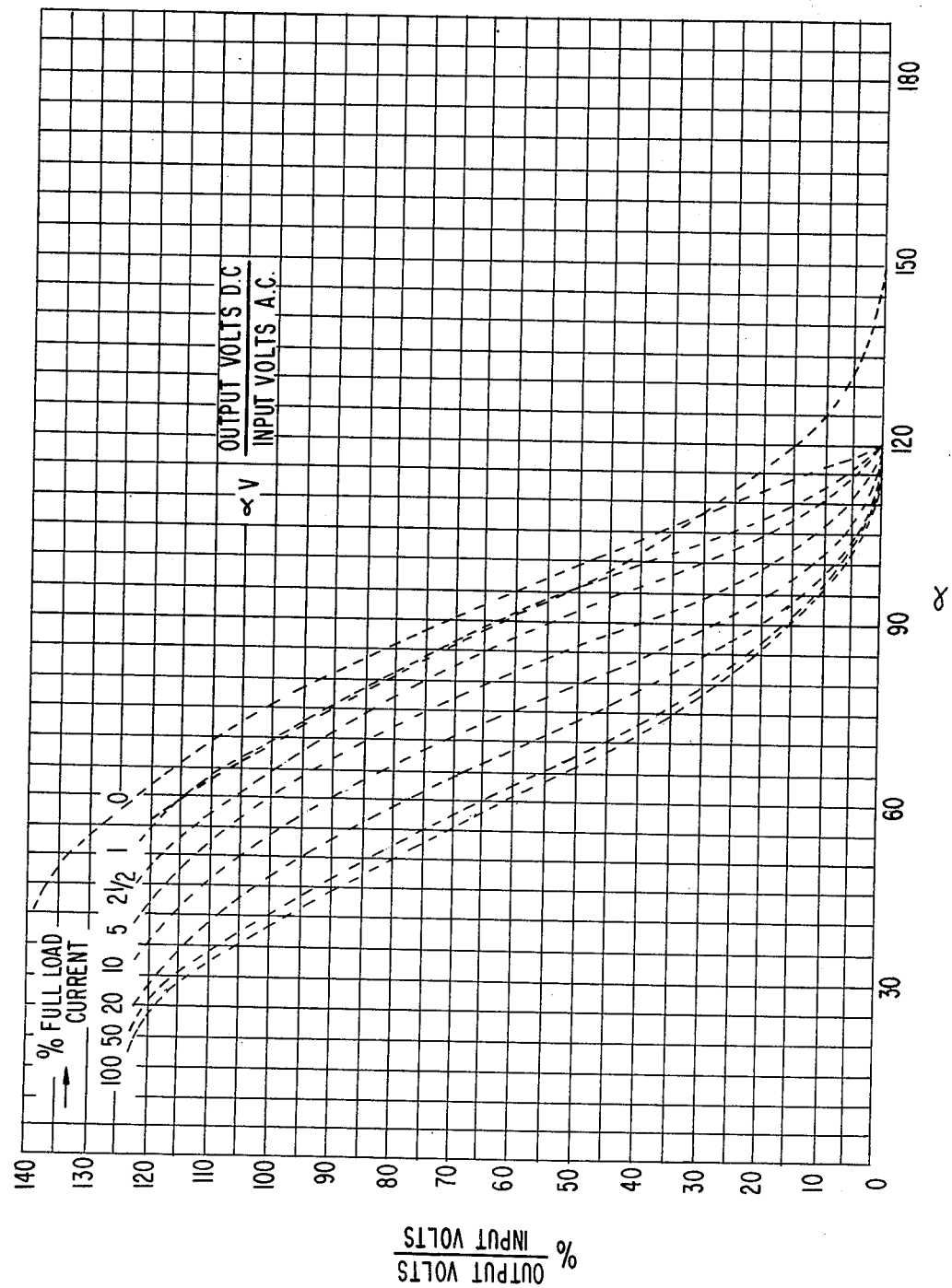
FIGS. 6A through 6F are graphic representations of various curves employed in the computation of SCR firing angles, the curves being stored in memory devices utilized by the firing pulse generator of FIG. 5.
Figure 6B:
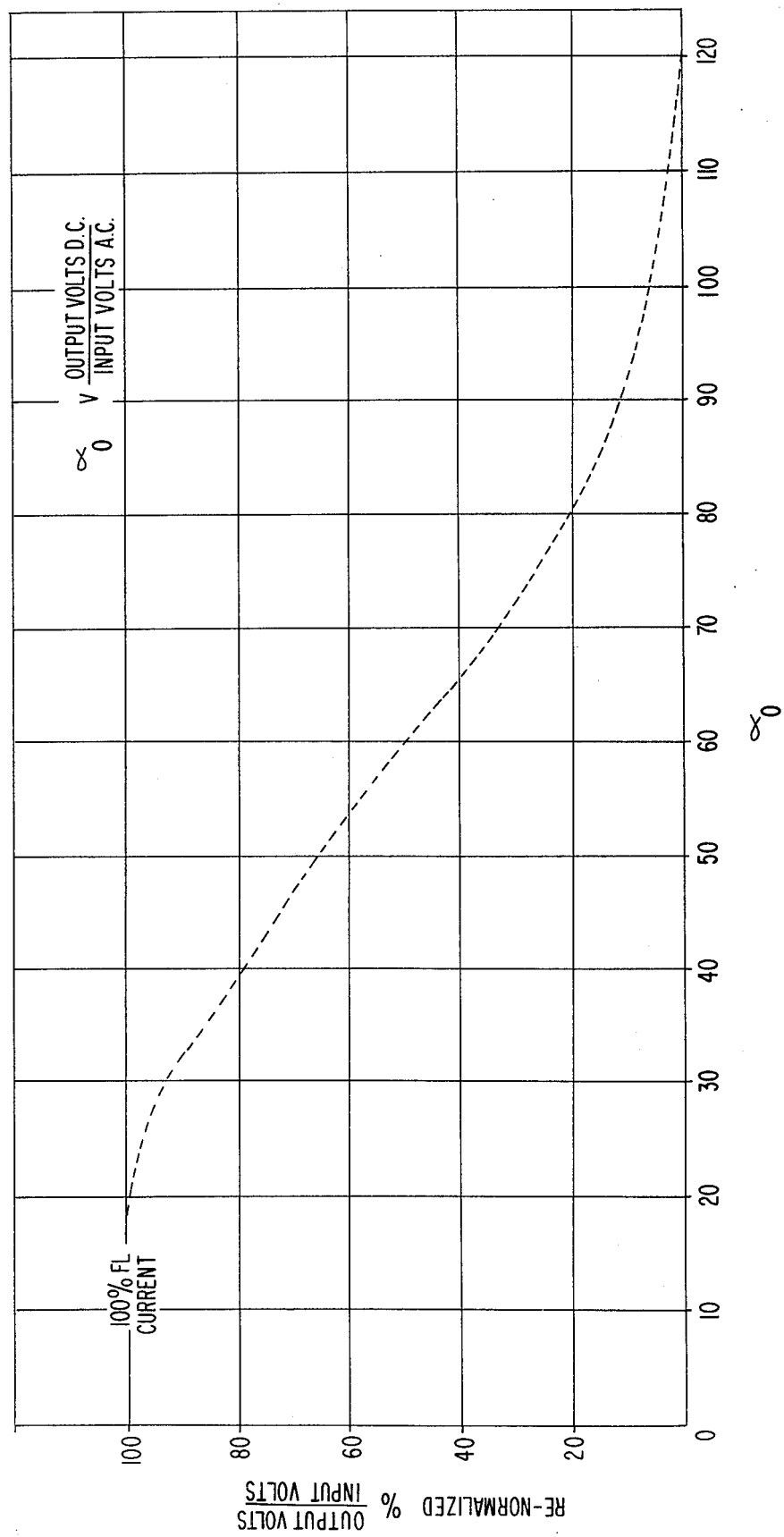
Figure 6C:
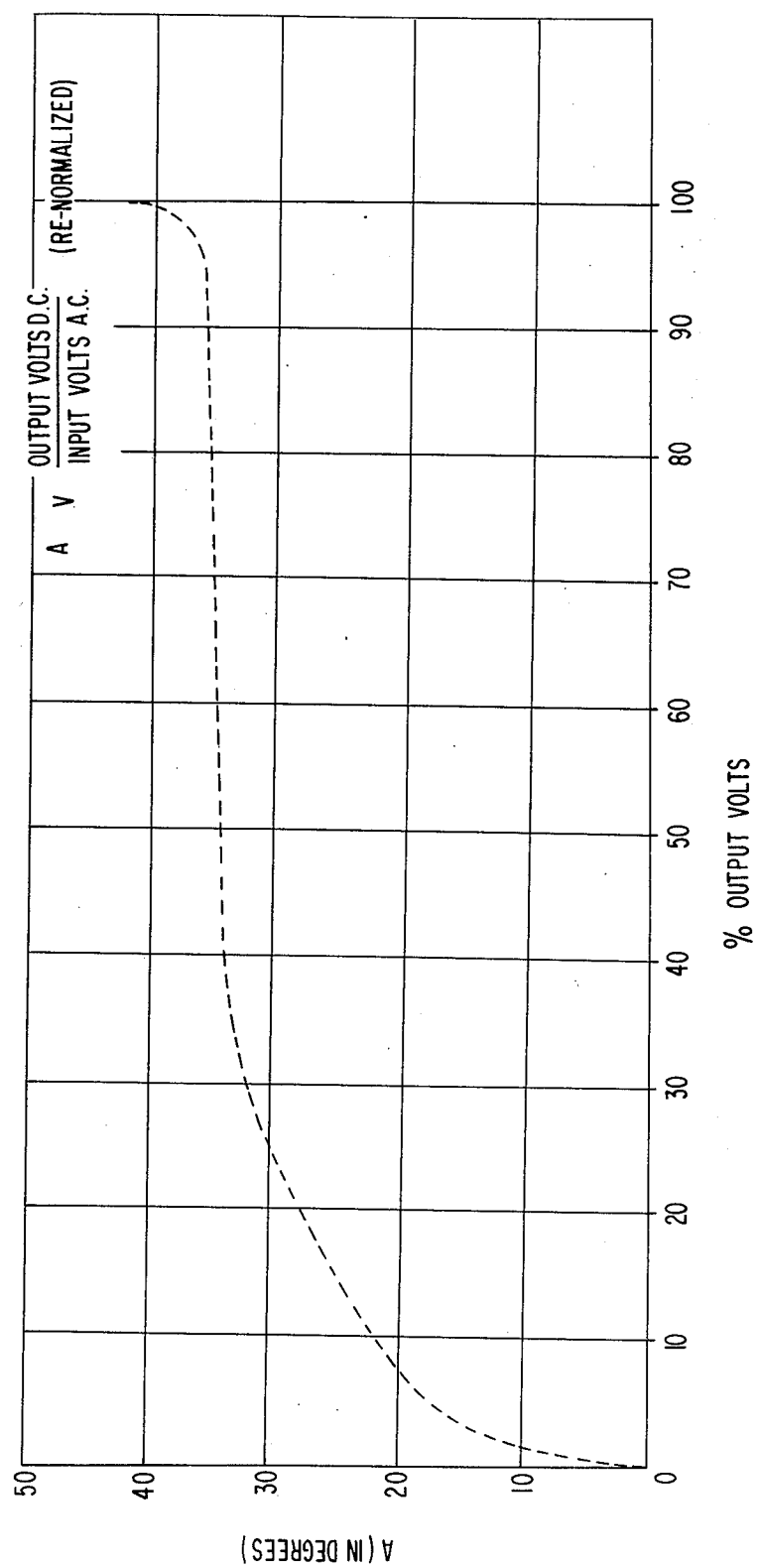
Figure 6D:
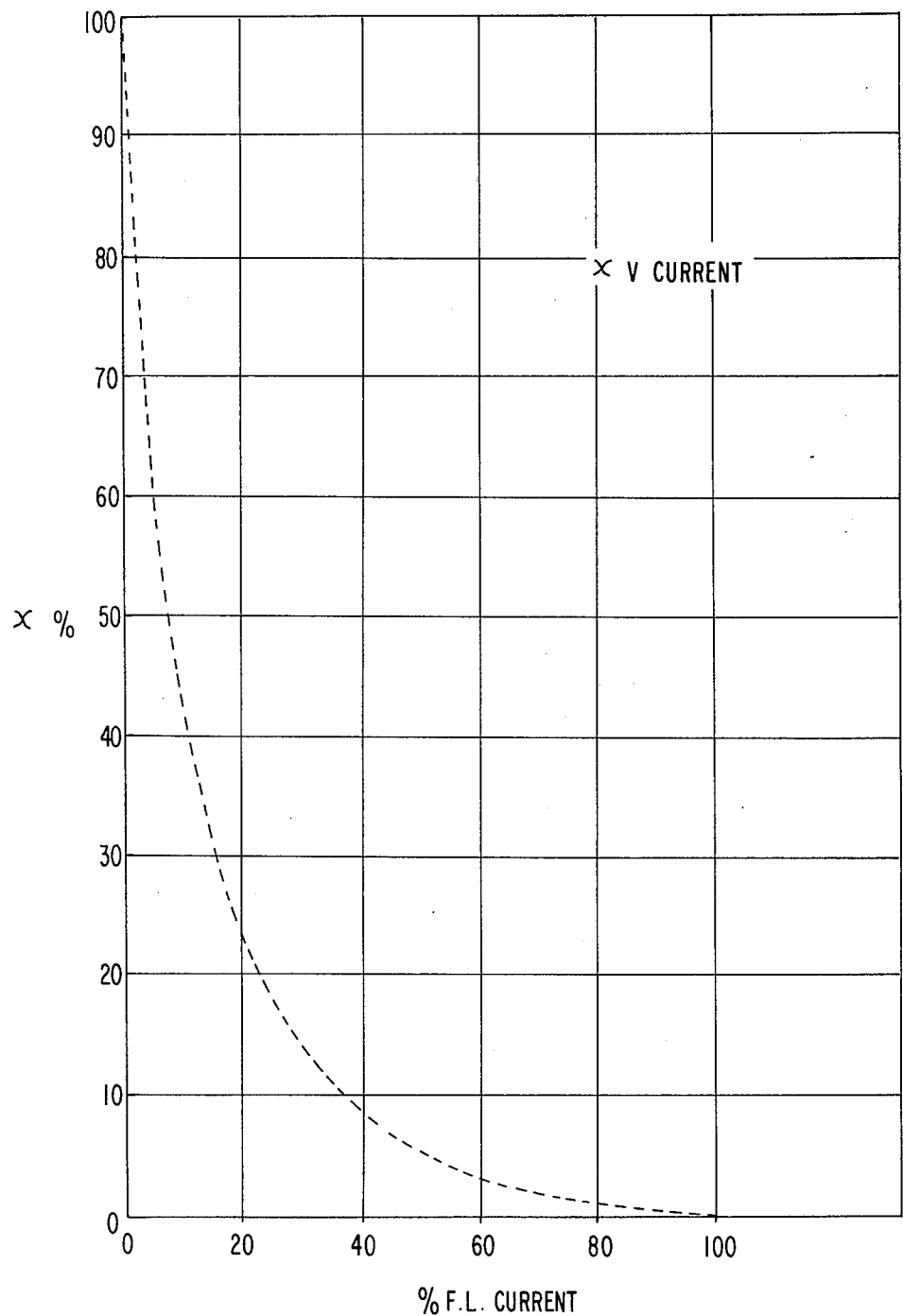

Curves representing the load current correction angle A as a function of the ratio of desired D.C. voltage output to A.C. mains voltage input and the fractional factor $\chi$ as a function of load current are graphically depicted in FIGS. 6C and 6D.

Figure 6E:
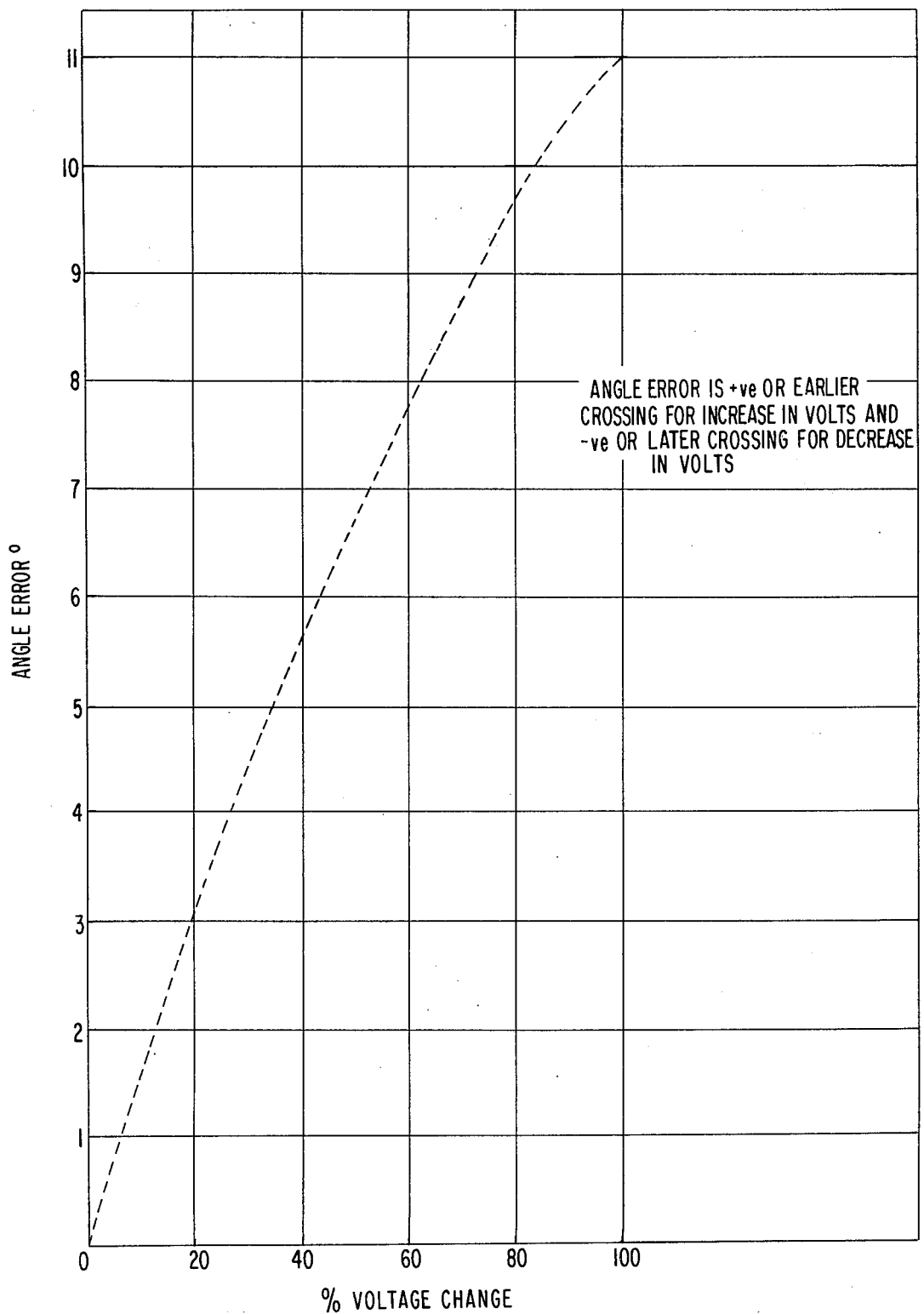
Figure 6F:
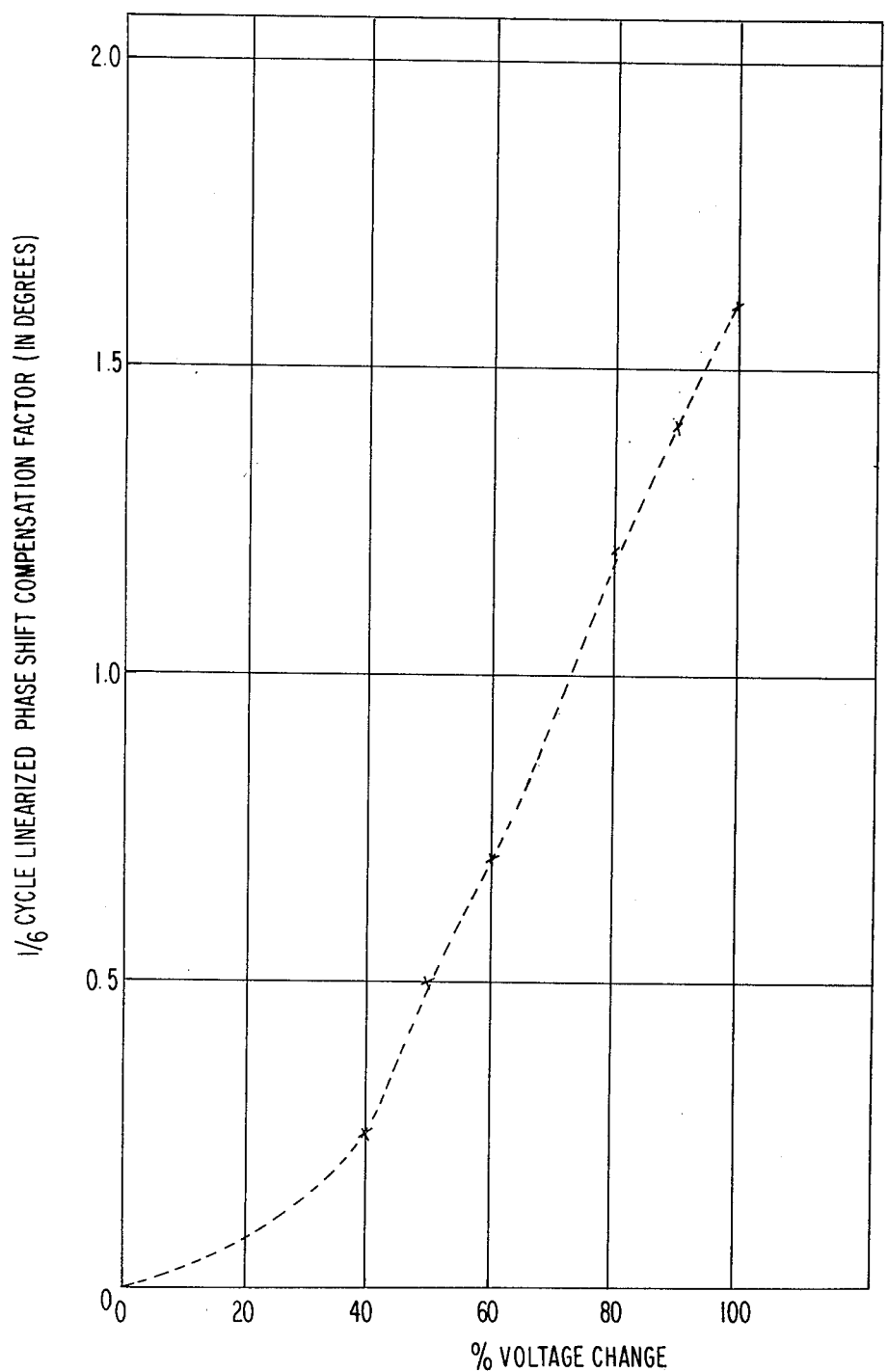

Finally, the phase shift compensation factor $\delta\alpha$ serves to offset any errors resulting from the fact that the three phases $R_1$, $S_1$ and $T_1$ of the A.C. mains voltage input may not be balanced with respect to one another (i.e., may exhibit zero-crossing shifts from the nominal with regard to the A.C. mains line neutral). $\delta\alpha$ may be empirically derived as a function of the variation in the value of the A.C. mains voltage input due to relative phase zero shifts. FIG. 6E graphically depicts the shift or error in phase angle zero for a given phase caused by a variation in the A.C. mains voltage input, the variation being indicated as a percentage of the nominal A.C. mains voltage input, while FIG. 6F graphically depicts, for each one sixth cycle of a given phase, the compensation factor necessary to offset the error or shift in phase angle zero as a function of A.C. mains voltage input variation.

FIG. 7 illustrates a detailed control schematic for implementing the operation of the firing pulse generator 60 of FIG. 5, whereby primary and auxiliary bridge rectifier SCR firing pulses are generated at precise firing angles determined in accordance with Equations (1) and (2) and the functions graphically depicted in FIGS. 6A–6F. The threephase A.C. mains voltage input from A.C. mains line 52 is tapped via a sensing lead such as sensing lead 62 of FIG. 5. Sensing lead 62 feeds the A.C. mains voltage input to a control transformer 67, which control transformer preferably comprises a small isolating transformer. The output from transformer 67 may be utilized to synchronize an oscillator 68 with the various zero crossings of the A.C. mains voltage phases, enabling the oscillator to supply internal control pulses at precisely defined intervals during each half-cycle of each A.C. mains voltage input phase $R_1$, $S_1$ and $T_1$. For example, in one preferred embodiment of the present invention oscillator 68 generates a single pulse on lead 70 per A.C. mains voltage input cycle, starting at zero degrees line-to-line. Leads 72, 74 and 76, meanwhile, each carry a series of six pulses per A.C. mains voltage input cycle, the pulses in each series following one another at sixty degree intervals. As can be seen in FIG. 8, STOP pulses on lead 72 occur at 60° and 240° into each phase of the A.C. mains voltage input while LOAD pulses on lead 74 occur at 62° and 242° into each phase of the A.C. mains voltage input and START pulses on lead 76 occur at 30° and 210° into each phase of the A.C. mains voltage input. If desired, a high-frequency signal suitable as a reference signal may also be output from oscillator 68 on lead 78.

The output from control transformer 67 may additionally be used to derive reference information regarding the zero crossings of each phase in the A.C. mains voltage input, thereby furnishing a means for computing the compensation factor $\delta\alpha$. The control transformer output is supplied to a positive half-cycle sample-and-hold circuit 80 and a negative half-cycle sample-and-hold circuit 82. Both sample-and-hold circuits 80 and 82 are integrating sample-and-hold circuits which measure the voltage content of each phase half-cycle in the A.C. mains voltage input. To this end, sample-and-hold circuits 80 and 82 are respectively triggered by START pulses on lead 76 at 30° and 210° into each phase cycle of the A.C. mains voltage input (i.e., at 30° into both the positive and negative half-cycles associated with each phase). At 60° and 240° into each phase cycle (i.e., at 60° into both the positive and negative half-cycles associated with each phase), STOP pulses on lead 72 respectively stop the operation of sample-and-hold circuits 80 and 82. Because 30° on a line-to-line basis is equivalent to 0° on a line-to-neutral basis, the output of each sample-and-hold circuit represents an integration of the voltage over time between an A.C. mains voltage zero crossing and 30°. Thus, the output of each sample-and-hold circuit is essentially a measure of one-half the peak voltage present in the A.C. mains voltage input during any given positive or negative half-cycle of an A.C. mains voltage input phase.

Sample-and-hold circuits 80 and 82 are both connected to a ratio-taking circuit 84. Ratio-taking circuit 84 functions to compute the ratio of the voltage content in the positive half-cycles of successive A.C. mains voltage input phases to the voltage content in the negative half-cycles of successive A.C. mains voltage input phases. A ratio of other than one-to-one is indicative of a zero crossover shift in one of the phases, which shift may be appropriately scaled to RMS values in scaling circuit 86 and converted by A/D converter 88 to provide a binary representation of the amount of phase angle zero shift in the given phase. The binary representation from A/D converter 88 serves as the phase shift compensation factor $\delta\alpha$ employed in Equation (1) to compute the necessary firing angle of the bridge rectifier SCR associated with the given phase. As previously mentioned, representative values of $\delta\alpha$ are plotted as a function of variation in A.C. mains voltage input in FIGS. 6E and 6F.

The outputs from the positive and negative half-cycle sample-and-hold circuits 80 and 82 may also be combined in a summing circuit 90 to provide a MAINS VOLTAGE signal having a value representing the magnitude of the A.C. mains voltage input. The MAINS VOLTAGE signal is compared with a fixed voltage reference signal in comparator circuit 92 in order to detect A.C. mains voltage drops below the threshold level established by the fixed voltage reference signal. If desired, this threshold level may be set at 80% of the nominal A.C. mains voltage input. When the actual A.C. mains voltage input drops below 80% of the nominal A.C. mains voltage input, comparator 92 outputs an ON/OFF signal which is subsequently used to initiate ride-through operation of the auxiliary bridge rectifier.

As is evident from FIG. 6A, the firing delay factor $\alpha$ is determined as a function of the ratio of the desired D.C. voltage output to the A.C. mains voltage input. A representation of the desired D.C. voltage output for purposes of implementing the FIG. 7 control schematic may be derived from a feedback loop connected to D.C. bus lead 56 of FIG. 5 via sensing lead 66. This feedback loop, which in practice employs a voltage-current regulator, is shown in simplified form as a variable gain amplifier 94 connected to receive the D.C. voltage output in feedback fashion. The variable gain factor of amplifier 94 is set in accordance with the desired D.C. voltage output, yielding a VOLTAGE OUTPUT control signal having a magnitude which varies as the D.C. voltage output varies and which is additionally adjusted upwardly or downwardly as a function of the desired D.C. voltage output. Owing to the presence of transformer 54 in D.C. power supply 44, a scaling of the VOLTAGE OUTPUT signal must be performed if the VOLTAGE OUTPUT signal is to serve effectively in controlling the D.C. voltage output to the desired level during both ride-through periods and periods where the auxiliary bridge rectifier 48 is not conducting. That is, the use of transformer 54 as a source of power for auxiliary bridge rectifier 48 introduces a gain factor into the total D.C. voltage output obtained for a given A.C. mains voltage input during ride-through conditions. If, for instance, transformer 54 as selected for use in the D.C. power supply of FIG. 5 has a 1-to-0.6 voltage ratio, the maximum attainable D.C. voltage output under ride-through conditions will equal the sum of the D.C. voltage outputs from both the primary and auxiliary bridge rectifiers or, assuming a demand for full D.C. voltage output (i.e., zero bridge rectifier SCR conduction angles), the value of the nominal A.C. mains voltage input multiplied by (1+0.6). It can accordingly be seen that the VOLTAGE OUTPUT signal derived from the actual D.C. voltage output feedback must either be scaled up during non-ride-through periods or scaled down during ride-through periods if the VOLTAGE OUTPUT signal is to accurately represent the adjustment in D.C. voltage output necessary to achieve the desired D.C. voltage output level. Because the ride-through period is the critical control period from the standpoint of the present invention, and further because a unity gain signal is more accurate than a fractional gain signal, it is preferable to scale the VOLTAGE OUTPUT signal upward during periods when the auxiliary bridge rectifier is not conducting. This is accomplished by passing the VOLTAGE OUTPUT signal through an amplifier circuit 96 having a gain equal to the total gain in D.C. voltage output attributable to the series connection between primary bridge rectifier 46 and auxiliary bridge rectifier 48. In the foregoing example, the gain of amplifier 96 would be (1+0.6) or 1.6. The output from amplifier 96, as well as the VOLTAGE OUTPUT signal itself, are both supplied to a voltage selector circuit 98. One or the other signal is directed through the voltage selector circuit to an A/D ratiometric converter 100 in response to the ON/OFF signal generated by comparator 92. Hence, during the ride-through periods of D.C. power supply operation, the VOLTAGE OUTPUT signal reaches ratiometric converter 100, while the output from amplifier 96 representing the VOLTAGE OUTPUT signal multiplied by the appropriate gain factor reaches the ratiometric converter when auxiliary bridge rectifier 48 is not conducting. The second or remaining input of ratiometric converter 100 receives the MAINS VOLTAGE signal from summing circuit 90, with the ratiometric converter thereafter outputting a RATIO signal having a value corresponding to the ratio of the desired D.C. voltage output to the A.C. mains voltage input.

The RATIO signal is supplied via lead 102 to a voltage PROM 104 and a voltage/current PROM 106. The $\alpha_o$ function graphically depicted in FIG. 6B is stored in voltage PROM 104, providing a means to ascertain the value of the firing delay factor for a particular ratio of desired D.C. voltage output to A.C. mains voltage input. The RATIO signal from ratiometric converter 100 acts as an address signal, permitting the voltage PROM to look up the value of $\alpha_o$ corresponding to the value of the RATIO signal. The load current correction angle A graphically depicted in FIG. 6C is stored in the voltage/current PROM 106. Again using the RATIO signal as an address signal, the value of A may be derived for any given ratio of desired D.C. voltage output to A.C. mains voltage input. A simultaneous determination of the fractional factor $\chi$ is accomplished using a current PROM 108 in which the $\chi$ function graphically depicted in FIG. 6D is stored. Current PROM 108 is addressed by a CURRENT signal representing the actual load current being drawn from the D.C. power supply, expressed as a percentage of full load current. The CURRENT signal may be generated by furnishing a measure of the actual load current via sensing lead 64 to an A/D converter 110, the reference voltage of the converter having a value set in accordance with the rated full-load current of the D.C. power supply such that the desired percentage relationship in the CURRENT signal is obtained. The output from current PROM 108 together with the output from voltage/current PROM 106 are supplied to a multiplier 112 which functions to generate a signal representing the product of A and $\chi$. As is evident from Equation (2) disclosed hereinabove, the output of multiplier 112 corresponds to the value of the load current correction factor $\Delta\alpha$ for the given ratio of desired D.C. voltage output to A.C. mains voltage input.

It should now be apparent that the use of the $\alpha_o$, A and $\chi$ curves respectively stored in voltage PROM 104, voltage/current PROM 106 and current PROM 108 minimizes the PROM capacity required for computing the firing angle $\alpha$ by eliminating the necessity for storing the full family of $\alpha$ curves illustrated in FIG. 6A. The firing delay factor $\alpha_o$ from the voltage PROM, the load current correction factor $\Delta\alpha$ derived from the voltage/current PROM and the current PROM via multiplier 112 and the phase shift compensation factor $\delta\alpha$ from A/D converter 88 are simply combined in adder 114 in accordance with Equation (1) to yield the full value of the firing angle $\alpha$ associated with each half-cycle of each phase $R_1$, $S_1$ and $T_1$ in the A.C. mains voltage input. The value of the firing angle $\alpha$ is then loaded into one of two programmable counters 116 or 118 in response to LOAD pulses received over lead 74 from oscillator 68. More specifically, programmable counter 116 is loaded at 62° into each phase cycle of the A.C. mains voltage input, i.e., at 62° into the positive half-cycle of each A.C. mains voltage input phase, while programmable counter 118 is loaded at 242° into each phase cycle of the A.C. mains voltage input, i.e., at 62° into the negative half-cycle of each A.C. mains voltage input phase. Returning to FIG. 8, it can be seen that the LOAD pulses generated on lead 74 by oscillator 68 alternate between the programmable counters. In this manner, each LOAD pulse establishes a 120° firing range with respect to the associated half-cycle of each A.C. mains voltage input phase $R_1$, $S_1$ or $T_1$. The 2° interval between the LOAD pulses on lead 74 and the STOP pulses on lead 72 enable the computation of $\alpha$ to be completed for each phase half-cycle prior to the loading of $\alpha$ into the programmable counters.

The loading of $\alpha$ into programmable counter 116 or 118 initiates a counting operation representing the time-to-firing of the particular SCR for which $\alpha$ has been computed. That is, upon loading, programmable counter 116 or 118 counts until reaching the value of $\alpha$, whereupon a firing pulse is generated at the counter output. The greater the firing angle $\alpha$, the longer the interval leading up to the firing pulse and, conversely, the smaller the firing angle $\alpha$, the shorter the interval until the firing pulse is generated. The firing pulses themselves are supplied to a gating circuit 120 of conventional design which directs individual firing pulses to the various SCR's of the FIG. 5 primary and auxiliary bridge rectifiers 46, 48 in order to initiate bridge rectifier conduction. The ON/OFF signal from comparator 92, indicating whether ride-through operation is or is not required, is supplied to gating circuit 120 for the purpose of enabling firing pulses to reach the auxiliary bridge rectifier SCR's during the ride-through period. Upon reflection, it is evident that, under ride-through conditions, each SCR in the auxiliary bridge rectifier 48 fires at the same angle as its phase and half-cycle counterpart in the primary bridge rectifier 46. Again, conventional means in gating circuitry 120 are employed to maintain proper phase and half-cycle correspondence between the particular firing angle $\alpha$ loaded into one or the other of programmable counters 116 and 118 and the particular SCR fired as a result thereof. A carrier oscillator 122 furnishes the necessary carrier frequency for transporting the firing pulses to the various SCR's in both the primary and auxiliary bridge rectifiers.

Although the FIG. 7 embodiment of the firing pulse generator utilizes dedicated hardware, many of the control functions exercised at various points in the control schematic of FIG. 7 could as easily be implemented in microprocessor form. For example, oscillator 68 could in large degree be replaced by a software clock pulse counting device which generates the various START, STOP and LOAD pulses at appropriate count intervals in the software routine. Software implementation would still allow real time computations of SCR firing angles, despite the fact that some additional count scaling operations may be necessary in order to offset any frequency shifts in the A.C. mains voltage signals used to synchronize the software operation. Delays introduced by such scaling would consume some portion of the available firing angle range, and may cause the loss of the top fraction of D.C. voltage output otherwise available on the D.C. power supply bus leads. Nevertheless, this loss should not amount to more than 1% of the entire D.C. voltage output available from the two bridge rectifiers, rendering the software implementation of the control circuit oscillator entirely feasible. Of course, software implementation of other control functions in the control schematic of FIG. 7 can be accomplished with equal ease.

The present invention has been set forth in the form of several preferred embodiments. It is nevertheless understood that modifications to the circuit configurations and control schematic disclosed herein, including in particular modifications adapting the circuit configurations and control schematics for software implementation, may be made by those skilled in the art without departing from the scope and spirit of the present invention. Moreover, such modifications are considered to be within the purview of the appended claims.

We claim:

1. A regulated D.C. power supply driven by an A.C. voltage input to supply load current at a D.C. voltage output level which may be adjusted to a desired value, said power supply comprising:
- a first circuit means for receiving the A.C. voltage input and for providing said load current in response thereto at an adjustable D.C. voltage output level;
- a second circuit means connected in series with said first circuit means for supplementing said adjustable D.C. voltage output level from said first circuit means whenever the A.C. voltage input received by said first circuit means drops below a predetermined threshold level; and
- control means for governing the operation of both said first circuit means and said second circuit means as a function of the A.C. input voltage level, the load current level and said desired value of said D.C. voltage output level such that said adjustable D.C. voltage output level reaches said desired value.

2. A regulated D.C. power supply as set forth in claim 1, wherein the A.C. input received by said first circuit means is derived from an A.C. source and said second circuit means is also connected to receive A.C. input from the A.C. source.

3. A regulated D.C. power supply as set forth in claim 2, wherein the A.C. source includes an A.C. mains line and said second circuit means includes a transformer which taps the A.C. mains line.

4. A regulated D.C. power supply as set forth in claim 2, wherein said first and second circuit means respectively include phase controlled rectifiers.

5. A regulated D.C. power supply as set forth in claim 4 wherein said phase controlled rectifiers are arranged in bridge configuration.

6. A regulated D.C. power supply as set forth in claim 5, wherein said phase controlled rectifiers each employ at least one silicon controlled rectifier.

7. A regulated D.C. power supply as set forth in claim 2, wherein said first circuit means includes a phase controlled rectifier and said second circuit means includes a half-phase controlled rectifier.

8. A regulated D.C. power supply as set forth in claim 7, wherein said phase controlled rectifier and said half-phase controlled rectifier are both arranged in bridge configuration.

9. A regulated D.C. power supply as set forth in claim 8, wherein said phase controlled rectifier and said half-phase controlled rectifier each employ at least one silicon controlled rectifier.

10. A regulated D.C. power supply as set forth in claim 1, wherein said first circuit means includes a bus means for removing said D.C. output from said first circuit means and said regulated D.C. power supply further comprises a diode connected in series with said bus means, said second circuit means being connected across said diode.

11. A regulated D.C. power supply driven by an A.C. voltage input to supply load current at a D.C. voltage output level which is adjustable to a desired value, said power supply comprising:
- a first phase controlled rectifier means for receiving the A.C. voltage input and for providing said load current in response thereto at an adjustable D.C. voltage output level;
- a second phase controlled rectifier means connected in series with said first phase controlled rectifier means for supplementing said adjustable D.C. voltage output level from said first phase controlled rectifier means whenever the A.C. voltage input received by said first phase controlled rectifier means drops below a predetermined threshold level; and
- control means connected to both said first and second phase controlled rectifier means for governing the conduction thereof such that said adjustable D.C. voltage output level reaches said desired value, said control means including a computing means which establishes intervals of conduction for both said first and second phase controlled rectifier means as a function of the A.C. voltage input level, the load current level and said desired value of said D.C. voltage output level.

12. A regulated D.C. power supply as set forth in claim 11 wherein said first and second phase controlled rectifier means respectively include phase controlled rectifiers arranged in bridge configuration and said computing means calculates firing angles for said phase controlled rectifiers in both said first and second phase controlled rectifier means in order to establish said intervals of conduction.

13. A regulated D.C. power supply as set forth in claim 12, wherein said computing means includes arithmetic circuit means which determines said firing angles for said phase controlled rectifiers by arithmetically combining a firing delay factor and a load current correction factor, said firing delay factor being derived as a function of the ratio of said desired value of said D.C. voltage output level to the A.C. voltage input level, said load current correction factor being derived as a function of the ratio of the load current associated with said desired value of said D.C. voltage output level and the load current associated with the maximum D.C. voltage output level obtainable from said power supply.

14. A regulated D.C. power supply as set forth in claim 13, wherein the A.C. voltage input is a multi-phase voltage input and said computing means further includes a compensation circuit means for modifying said firing angles by a phase-shift compensation factor which acts to offset any imbalance in the phases of the multi-phase A.C. voltage input.

15. A regulated D.C. power supply as set forth in claims 12, 13 or 14, wherein said phase controlled rectifiers comprise silicon-controlled rectifiers.

16. A regulated D.C. power supply as set forth in claim 12, wherein said first phase controlled rectifier means comprises a full phase controlled rectifier and said second phase controlled rectifier means comprises a half-phase controlled rectifier.

17. A regulated D.C. power supply as set forth in claim 16, wherein said full phase controlled rectifier includes a plurality of silicon-controlled rectifiers arranged in bridge configuration and said half-phase controlled rectifier includes paired silicon-controlled rectifiers and diodes arranged in bridge configuration.

18. A method for providing a regulated supply of D.C. power from an A.C. voltage input, said method comprising the steps of:
- converting the A.C. voltage input to a first D.C. voltage output capable of sustaining a load current whenever the A.C. voltage input is greater than a predetermined threshold;
- converting the A.C. voltage input to a second D.C. voltage output also capable of sustaining a load current and combining said second D.C. voltage output in series with said first D.C. voltage output whenever the A.C. voltage input drops below said predetermined threshold level; and
- adjusting said first and second D.C. voltage outputs to a desired D.C. voltage output level as a function of the A.C. voltage input, the load current level and said desired D.C. voltage output level.

* * * * *